June 21, 1927.
D. HANAUER
1,633,545
SPRING STRUCTURE
Filed Jan. 22, 1926
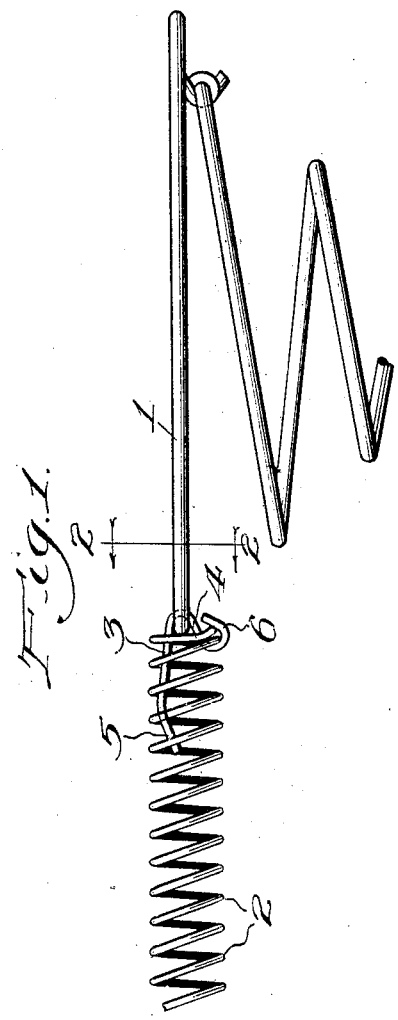
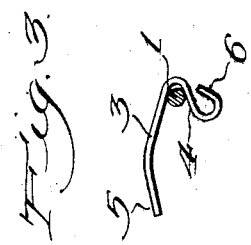
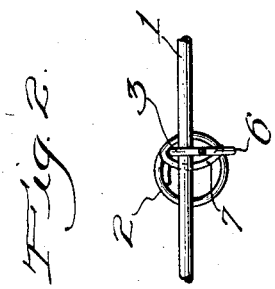
Inventor:
Darwin Hanauer,
by Wm. F. Freudenreich,
Atty.

Patented June 21, 1927.

1,633,545

UNITED STATES PATENT OFFICE.

DARWIN HANAUER, OF LA GRANGE, ILLINOIS, ASSIGNOR TO KINNEY ROME COMPANY, A CORPORATION OF ILLINOIS.

SPRING STRUCTURE.

Application filed January 22, 1926. Serial No. 82,953.

The present invention relates to structures such as bed springs, in which there are many vertical spiral springs having their upper or other rings connected together by short helical springs. Since each helical spring must be fastened by hand at each of its two ends, and since there are many such helical springs in each bed spring, for example, it is desirable that the connections or the fastening means be such that the attachment of the helical springs may be quickly and easily effected in order that the cost of the structure as a whole be kept as low as possible. On the other hand, it is essential that the fastenings be permanent so that the helical springs cannot accidentally become detached and it is also desirable that there be no projecting wire ends that can catch in fabric engaged with the spring structure or with a brush or cloth used in dusting the structures. Small wire clips are usually employed to fasten the ends of the helical springs to the special springs. These clips frequently slide along the wires of the spiral springs and thus permit displacement of the helical springs with respect to the latter, thereby causing the paint to be scraped off and squeaking noises to be made when a person lying on the spring turns over or moves. When the paint is scraped off the springs they are not only rendered unsightly but the exposed metal rusts and discolors the mattress and bedding coming in contact therewith.

The object of the present invention is to produce a simple and novel means whereby an end of a helical spring may be quickly and easily fastened to a ring of a spiral spring or other element, which shall be permanent to the extent that accidental unfastening is prevented, and which shall leave the structure free from projecting wire ends.

A further object of the present invention is to produce a novel form of clip which will be self-locking on the spiral springs and prevent accidental displacement thereof and of the end of the corresponding helical spring angularly of the spiral spring and the annoyances consequent to such displacement.

The various features of novelty whereby my invention is characterized will hereinafter be pointed out with particularity in the claim; but, for a full understanding of my invention and of its objects and advantages, reference may be had to the following detailed description taken in connection with the accompanying drawing, wherein:

Figure 1 is a side view of a fragment of a spiral bed spring and a portion of one of the helical springs for connecting it to an adjacent spiral spring, the two springs being fastened together in accordance with my invention; Fig. 2 is a section taken approximately on line 2—2 of Fig. 1 and Fig. 3 is an elevation of the fastening clip applied to the wire of the spiral springs, which is shown in section.

Referring to the drawing, 1 represents the upper ring of an ordinary spiral bed spring or the like, and 2 is a horizontal helical spring fastened at one end to the ring 1 and adapted to be fastened at its other end to a second spiral spring, not shown.

The fastening means consists of a simple wire clip in the form of a V having a long arm 3 and a short arm 4. The free end of the arm 3 is bent laterally toward the other arm, as indicated at 5, while the free end of the short arm 4 is bent into the form of a substantially closed eye 6 located on the outer side of the arm. In assembling the parts, the clip is first hooked over the wire 1 and held in the position indicated in Fig. 1. An end of the helical spring is then slipped over the long arm of the clip and the free end of the wire of the helical spring is threaded through the eye. The spring is then turned so as to carry the wire thereof well through the eye, and the endmost coil 7 is flattened or clinched as shown in Fig. 2, to prevent the helical spring from being released from the clip by a backward turning movement. The bent end of the long arm of the clip constitutes a guide that permits the clip to be readily entered into the open end of the spring, even though the width of the clip at its widest portion is made as great as the internal diameter of the helical spring. Since the extreme end of that portion of the short arm that constitutes the eye lies close to the main portion of said arm, the clip presents a substantially smooth outer contour, there being only the slight shoulder formed by the extreme end of the wire, and this shoulder will extend behind the endmost ring of the helical spring. Therefore, since the end of the wire of the helical spring is clinched inwardly, and there is no projecting end on the clip outside of the helical spring, there are no points or projections on which a cloth or the like can catch when the spring structure is being dusted or which can prick the fingers or scratch the hands of anyone working with or upon the spring structure.

The closed end of the clip is sufficiently narrow, as shown in Fig. 3, to prevent the wire of the spiral spring from seating itself solidly into the bottom of the V. In other words, the clip touches the wire of the spiral spring at two points, only so that the wire is wedged in place and held in a firm grip in the clip.

It will thus be seen that I have produced a simple and novel device for quickly and easily fastening the end of a helical spring to the wire or ring of a spiral spring or the like, in such a manner that there can be no accidental slipping of the one on the other to result in scraping off paint,—objectionable noises in the use of the spring cushion, and rusting of exposed metal surfaces, and so that no projecting wire ends are left, but the entire area around the joint remains smooth and rounded without sharp corners or projecting ends.

While I have illustrated and described with particularity only a single preferred form of my invention, I do not desire to be limited to the exact structural details thus illustrated and described; but intend to cover all forms and arrangements which come within the definitions of my invention constituting the appended claim.

I claim:

The combination with a ring of a spiral spring and a helical spring lying in the same plane as said ring and engaged at one end therewith, of a V-shaped clip looped over the wire of said ring and having its arms extending into the helical spring, one of the arms of the clip being bent outwardly through the helical spring to form a substantially closed eye lying close to the apex of the clip and embracing a terminal coil of the helical spring so as to hold the coil in said engagement with the ring, and the parts being so proportioned that the bend connecting the two arms of the clip stands apart from the adjacent portion of said ring to permit the ring to be wedged into the clip.

In testimony whereof, I sign this specification.

DARWIN HANAUER.